April 28, 1970  E. E. HARSHMAN ET AL  3,509,296
RESILIENT VARIABLE-CONDUCTIVITY CIRCUIT CONTROLLING MEANS
Filed Oct. 23, 1967

INVENTORS
EVERETT E. HARSHMAN
RICHARD W. LEWIS

BY *Louis A. Kline*
*Albert L. Sessler, Jr.*
THEIR ATTORNEYS

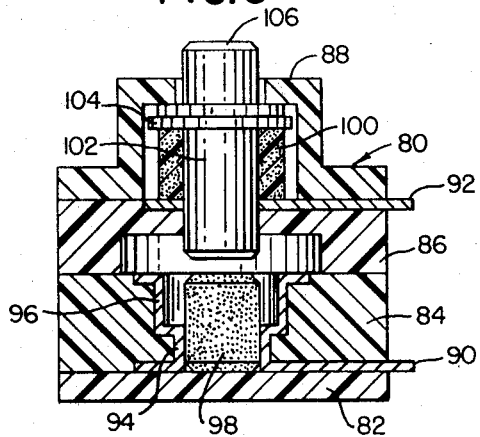
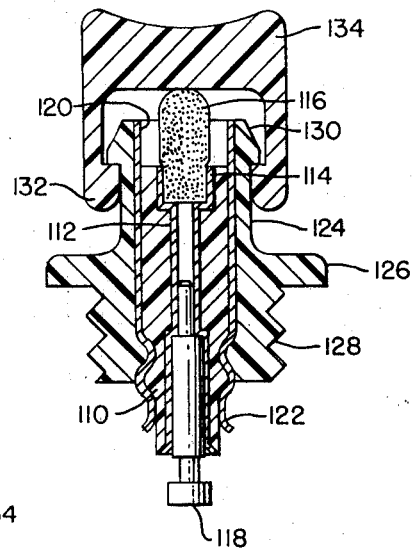
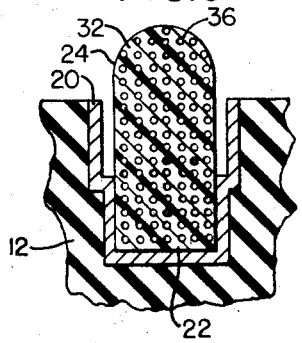
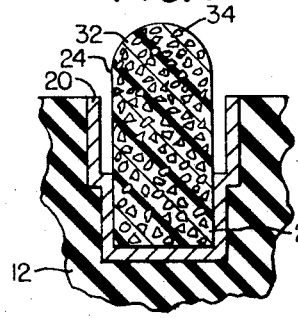
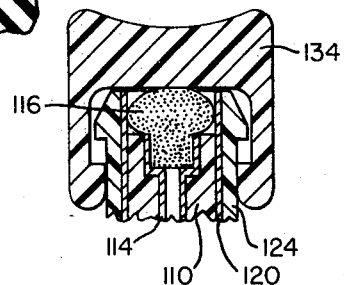
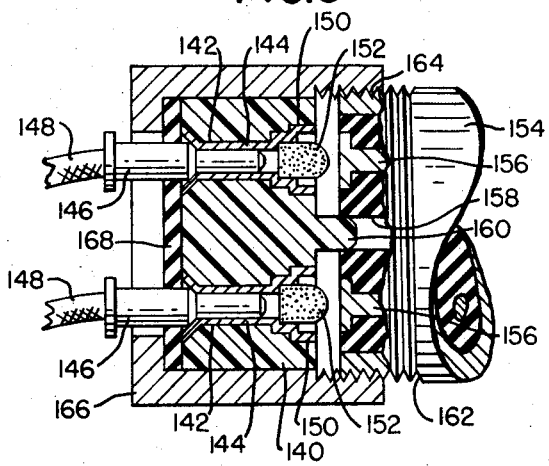

United States Patent Office 3,509,296
Patented Apr. 28, 1970

3,509,296
RESILIENT VARIABLE-CONDUCTIVITY CIRCUIT CONTROLLING MEANS
Everett Eldon Harshman, Dayton, and Richard W. Lewis, Centerville, Ohio, assignors to The National Cash Register Company, Dayton, Ohio, a corporation of Maryland
Filed Oct. 23, 1967, Ser. No. 677,219
Int. Cl. H01h 43/08
U.S. Cl. 200—46                    11 Claims

ABSTRACT OF THE DISCLOSURE

Electrical circuit controlling means which utilize one or more compressible resilient circuit components, each positioned at least partially within a recess in a supporting structure, said recess having conductive side walls forming one element of the circuit controlling device, the circuit component having a low conductivity when in a noncompressed condition and a relatively high conductivity when compressed, said circuit component thus forming a second element of the circuit controlling device and being engageable with a further conductive element, which forms the third element of the circuit controlling device. This circuit controlling device is employed in a number of different applications, including switches, connectors, and media sensing apparatus.

BACKGROUND OF THE INVENTION

The invention herein described was made in the course of or under a contract with the Department of the Army.

This invention relates to circuit controlling means, and more particularly pertains to circuit controlling means for use in various types of electrical applications in which the control of electrical currents by the application of pressures of small magnitude is important.

The use, in electrical circuit controlling means, of elements which vary in conductivity in accordance with the degree of pressure applied thereto is known broadly in the prior art, as shown, for example, by the following representative United States Patents: Kemper, No. 2,044,080; La Bell, No. 2,305,717; and Deibel et al., No. 3,125,739. The prior art devices disclosed in these patents appear to be designed primarily for heavy-duty applications, as, for example, where actuation of a circuit by foot pressure or vehicle pressure is desired.

SUMMARY OF THE INVENTION

In the circuit controlling means of the present invention, control of electrical currents by the application of pressures of small magnitude is achieved by use, in cooperation with first and second conductive elements, of a compressible resilient member having the property of altering its conductivity in response to a change in the pressure applied to it. The compressible resilient member is located in a recess in a nonconductive structure, with at least one of the conductive elements disposed on the sidewalls of the recess in such a manner as to provide a short-distance conductive path through the compressible resilient member when pressure is applied thereto to cause it to assume a high-conductivity state. The configuration of the compressible resilient member is such as to facilitate its contact with the two conductive elements and its furnishing of a short-distance, high-conductivity path therebetween when pressure is applied to it.

The configuration of the various components of the circuit controlling devices of the present invention provides a capability for operation in response to relatively low actuating pressures, which capability is most useful in connection with many types of miniaturized circuitry, and which is not shown to be present in the examples of prior art set forth above.

Accordingly, it is an object of the present invention to provide novel circuit controlling means which are operable in response to low actuating pressures.

A further object is to provide novel circuit controlling means employing, in cooperation with first and second conductive elements, a compressible resilient member having the property of altering its conductivity in response to a change in the pressure applied to it.

BRIEF DESCRIPTION OF THE DRAWINGS

With the above and other objects, which will become apparent from the following description, in view, the invention includes novel features of construction and combinations of parts, a plurality of forms or embodiments of which are hereinafter described with reference to the drawings which accompany and form a part of this specification.

In the drawings:

FIG. 3 is an enlarged fragmentary section view of one form of compressible resilient circuit member which may be employed in the circuit controlling means of the present invention.

FIG. 4 is an enlarged fragmentary sectional view, similar to FIG. 3, but showing another form of compressible resilient circuit member which may be employed in the circuit controlling means of the present invention.

FIG. 5 is a sectional view of another embodiment of the novel circuit controlling means of the present invention employed as a switch, in which manually operable means are provided for controlling the condition of the device.

FIG. 6 is a sectional view of a further embodiment of the novel circuit controlling means of the present invention employed as a switch, in which manually operable means are provided for controlling the condition of the device.

FIG. 7 is a fragmentary sectional view of the embodiment of FIG. 6, showing the device in operated condition.

FIG. 8 is a fragmentary sectional view of a further embodiment of the novel circuit controlling means of the present invention employed as a connecting device.

DESCRIPTION OF THE PREFERRED EMBODIMENTS

Figure 1:
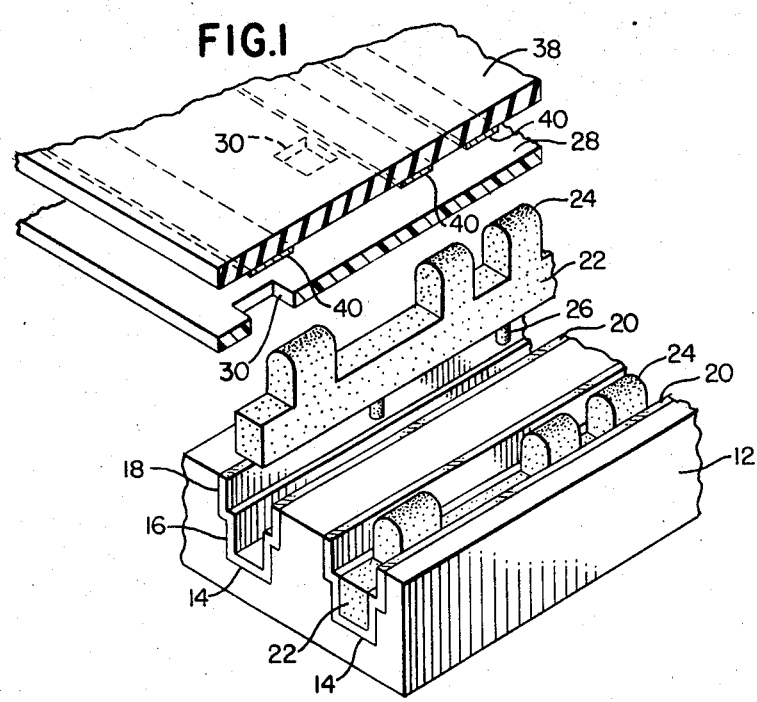
FIG. 1 is a fragmentary, perspective detail view, partially exploded, of one embodiment of the novel circuit controlling means of the present invention employed in a media sensing device.

In FIG. 1, the essential elements of a media sensing device are shown in fragmentary form. A supporting structure or base 12 is formed of suitable nonconductive material, such as an epoxy-glass laminate, and is provided with a plurality of parallel slots 14 extending transversely across the base. Each slot has a stepped cross-sectional configuration, with a narrow rectangular lower portion 16, and a wider rectangular upper portion 18. Disposed on the sidewalls and base of each slot 14 is a conductive element 20, which extends continuously along the slot for its length and is provided with a terminal of appropriate type (not shown) for connection to the electrical sensing circuitry of the media sensing device. The conductive elements 20 may be plated or otherwise deposited on the base and sidewalls of the slots by a suitable process, if desired, or each element may take the form of an appropriately shaped strip secured in the slot.

Dimensioned to fit within the narrow lower portion of the slot 14 is an elongated compressible resilient member 22 having a lower portion of rectangular cross section and a length equal to the length of the slot 14, and also including a plurality of upstanding projections 24 of sufficient height to enable them to project slightly above the upper surface of the base 12 when the member 22 is positioned in the slot 14. Any suitable means of securing the member 22 in the slot may be employed, and in the illustrated embodiment, the member 22 is provided with a plurality of small bosses 26, which cooperate with a corresponding plurality of bores (not shown) in the base of the slot 14, extending through the strip 20 and into the base 12 to enable the member 22 to be anchored in the slot 14.

The projections 24 are located on the member 22 to correspond to predetermined areas on a record member 28, which may be perforated, as shown by the perforation 30, to encode the record member with information according to a predetermined code.

The compressible resilient member 22 may be formed of any suitable material having the characteristic property of changing its conductivity in accordance with the degree of pressure applied to it, so that an increase in pressure, and consequent compression, cause an increase in conductivity of the material. In the preferred embodiments of the invention described herein, a compressible plastic material 32 (FIGS. 3 and 4), somewhat porous in nature, which may be generally described as a fluorosilicone-based elastomer, in combination with a conductive filler distributed substantially uniformly through the material, is employed. This conductive filler may take several forms, two of which are shown in FIGS. 3 and 4. In FIG. 4, the conductive filler is composed of a large number of particles or elements 34 of metallic or other conductive material of irregular flake-like configuration. In FIG. 3, the conductive filler is comopsed of a large number of particles or elements 36 of metallic or other conductive material having a substantially spherical configuration. Either of these forms may be employed in the present invention. Also, if desired, the projections 24 could be formed as individual elements or slugs of plastic material to be placed within individual recesses in the base 12, rather than utilizing a slot configuration and a series of connected projections 24 formed of a single piece of compressible resilient plastic material, as shown.

It will be apparent from an examination of FIGS. 3 and 4 that when the member 22 is in a non-compressed condition, the elements 34 or 36 are separated from each other and are, by and large, unable to form a conductive path through the plastic material 32. However, when the member 22 is compressed sufficiently, the individual elements 34 or 36 are brought into very close proximity or actual contact with each other, thus establishing a plurality of conductive paths through the member 22. It will also be noted that compression of the projection 24 causes it to spread transversely and engage the upper sidewall portions of the conductive strip 20, thus providing a plurality of relatively short-distance conductive paths from the upper surface of the projection 24 to the strip 20.

Returning now to the record media sensing device of FIG. 1, shown above the record member 28 is a closure member 38, which is of the same general shape as the base 12 and the record member 28, and which may be connected at one end to the base 12 by hinges or other suitable means (not shown). On the lower surface of the closure member 38 are secured a number of parallel elements 40 of conductive material, located at right angles to the slots 14 in the base 12, and extending transversely across the closure member 38. Each of the elements 40 is connected by a suitable terminal (not shown) to the electrical sensing circuitry of the media sensing device.

It will be seen that when a perforated record member 28 is inserted into the media sensing device between the base 12 and the closure member 38, and the closure member is closed to lie flat, conductive paths will be established between the conductive elements 20 and 40 in all of those locations in which there is a perforation in the record member 28. In all such cases, a projection 24 extends through a perforation 30, so that its upper end engages one of the conductive elements 40. At the same time, the projection 24 and a corresponding portion of the member 22 are compressed, so that the sides of the projection are forced against the upper sidewall portions of the element 20, and the various elements 34 or 36 are brought into close engagement or contact with each other, to establish a plurality of low-resistance, high-conductivity paths through the member 22, extending from the element 40 to the element 20, and particularly to the upper sidewall portions of the element 20, thus producing a much shorter conductive path than would be the case if said paths had to extend from the conductive element 40 to the base of the slot 14.

It will be obvious that the projections 24 will also be compressed in those areas where there are no perforations in the record member. In those instances, the record member acts as an insulating medium to prevent a conductive path from being established between the conductive elements 20 and 40.

The various points of electrical connection between the elements 20 and 40 can be read out in a conventional manner to provide complete information as to the data stored on the record member. When this has been completed, the closure member 38 is raised, the record member is removed, and the compressed projections 24 return to uncompressed condition by reason of their inherent resiliency.

Figure 2:
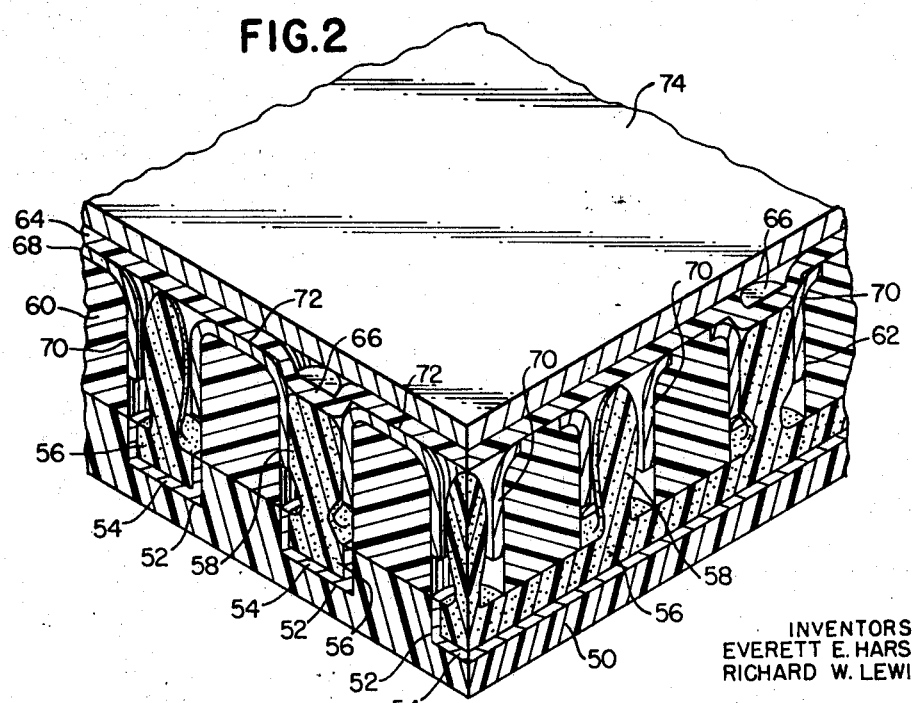
FIG. 2 is a fragmentary, perspective detail view of another embodiment of the novel circuit controlling means of the present invention employed in a media sensing device.

Shown in FIG. 2 is another form of media sensing device, which is similar in some respects to the device of FIG. 1 but which is designed for sensing of a record member in which information is recorded by means of raised areas or dimples on the record member, rather than perforations.

A supporting structure or base 50 of suitable nonconductive material is provided with a plurality of parallel slots 52 extending across the base. Disposed on the sidewalls and base of each slot 52 is a conductive element 54, which extends continuously along the slot for its length and is provided with a terminal of appropriate type (not shown) for connection to the electrical sensing circuitry of the media sensing device. The conductive elements 54 may be plated or otherwise deposited on the base and sidewalls of the slots by a suitable process, or each element may take the form of an appropriately shaped strip secured in the slot.

A plurality of elongated compressible resilient members 56 are dimensioned to fit within the slots 52. Each member 56 is provided with a plurality of projections 58, which are somewhat similar to the projections 24 of the members 22 of FIG. 1. The members 56 have the same characteristics as the members 22, of being nonconductive in a normal condition and having a relatively high conductivity in a compressed condition, and may be of the same composition as described for the members 22 and shown particularly in FIGS. 3 and 4.

An upper housing block 60 is secured to the upper surface of the base 50, and is provided with a number of recesses or apertures 62 equal to the total number of projections 58 in the sensing device, which in turn is equal to the total number of possible areas to be sensed on a record member 64. The apertures 62 (as well as the projections 58) are located in a predetermined pattern corresponding to the specific location on the record member 64 in which information may be encoded by means of a raised portion or dimple 66.

A plurality of conductive elements 68, extending at right angles to the conductive elements 54, are provided for the media sensing device of FIG. 2. Each element 68 includes a portion 70 disposed about the upper part of the sidewalls of each aperture 62 of a given row and an interconnecting portion 72 extending between each adjacent pair of apertures of a row.

The projections 58 of the compressible resilient members 56 extend to the upper surface of the upper housing block 60, and have a maximum dimension of cross-sectional width such that in their normal noncompressed condition, they do not engage the sidewall portions 70 of the conductive elements 68. However, this dimension is such that when they are compressed by a dimple 66 on the record member 64, the consequent transverse spreading will cause them to engage said sidewall portions, as will subsequently be described.

A closure member 74 forms part of the media sensing device of FIG. 2, and may be connected by hinges or other suitable means (not shown) at one end to the base 50 or the block 60. The closure member 74 serves to retain a record member 64 in proper sensing position in the media sensing device.

When a record member 64 is inserted into the media sensing device between the block 60 and the closure member 74, and said closure member is closed to lie flat, any raised portions or dimples 66 on the record member 64 will extend into corresponding apertures in the block 60 and will compress the projections 58 in those apertures, so that said projections are spread transversely to engage the portion 70 of the conductive element 68 associated with that row of apertures. This compression of the projections 58 also causes the establishment of conductive paths through the projections 58 and the corresponding lower part of the member 56, said conductive paths thus extending between the conductive elements 54 and 68 associated with the apertures into which dimples 66 extend. The various points of electrical connection between the conductive elements 54 and 68 can be read out in a conventional manner to provide complete information as to the data stored on the record member. When the read-out of this information has been completed, the closure member 74 is raised, and the record member 64 is removed. The projections 58 of the members 56 then return to their normal condition by virtue of their inherent resilience, and the electrical connections between the various conductive elements 54 and 68 are terminated.

The circuit controlling device of the present invention may also be embodied in a pressure-actuated switch, as shown in FIG. 5. The housing 80 of the switch is shown as made up of four elements 82, 84, 86, and 88 secured together by appropriate means, although it is obvious that the housing could be fabricated in many different ways. Two terminals 90 and 92 extend outwardly from the housing and are used to connect the switch into the circuitry with which it is used. The terminal 90 is connected to a conductive element 94, of stepped cylindrical configuration, disposed on the sidewall of a stepped cylindrical bore 96 in the housing element 84. Positioned in the bore 96 is a cylindrical compressible resilient cylinder 98 having the same properties of low conductivity in normal state and relatively high conductivity in compressed state, as described previously for the members 22 and 56 of the embodiments of FIGS. 1 and 2.

The parts 86 and 88 of the switch housing 80 are also provided with a plurality of cylindrical bores. The terminal 92 is positioned on the upper surface of the part 86 and includes an enlarged annular inner portion which supports an annular member 100 made from the same material as the element 98. This member 100 serves a dual purpose of acting as a spring means and a conductive means, as will subsequently be described. Furthermore, it supports a conductive plunger 102, which extends downwardly through openings in the member 100 and the terminal 92, and which is provided with a flange 104, which rests upon the upper surface of the member 100. A nonconductive cover and actuator 106 is positioned atop the flange on the plunger 102 and extends through an opening in the part 88 to furnish a means whereby the switch can be actuated manually or by means of a suitable mechanical actuator.

The mode of operation of the switch of FIG. 5 is believed to be apparent from the above description taken with the drawing, but will be explained briefly. The plunger 102 and the actuator 106 are normally maintained in the position in which they are shown in FIG. 6 by the compressible resilient annular member 100, and in this position the switch is open, with no current passing between the terminals 90 and 92. Depression of the actuator 106 against the bias of the member 100 compresses said member 100, forces the plunger 102 downward, and causes it to engage and compress the cylinder 98, which is also deformed in a transverse direction to engage that portion of the conductive element 94 disposed in the larger upper portion of the bore 96. Compression of the cylinder 98 and the annular member 100 causes both of them to assume a state of relatively high conductivity. A circuit path is thus completed, extending from the terminal 90 through the conductive element 94, the compressed cylinder 98, the plunger 102, and the compressed annular member 100 to the terminal 92. Conduction over this path continues for as long as the actuator 106 is depressed, and is terminated when pressure on said actuator is released, since the resilience of the cylinder 98 and the annular member 100 causes the plunger and actuator of the switch to return to the nonconducting position in which they are shown in FIG. 5.

A second type of pressure-actuated switch embodying the circuit controlling device of the present invention is shown in FIGS. 6 and 7. In this switch, a central supporting member 110 has an axial bore 112, made up of sections of varying diameter, in which is positioned a conducting element 114 of corresponding configuration. A compressible resilient member 116, of generally cylindrical configuration, is positioned in an enlarged upper portion of the conducting element 114, and has the same properties of low conductivity in a normal state and relatively high conductivity in a compressed state as described previously for the members 22, 56, 98, and 100 in the embodiments of FIGS. 1, 2, and 5, respectively.

A terminal 118 is positioned in the lower portion of the conducting element 114 and provides a convenient means for connecting the switch of FIG. 6 to one conductor of an electrical circuit arrangement in which it is to be used. The connection of the switch into a circuit may be completed with a second conducting element 120 having a terminal portion 122 at its lower end. The conducting element 120 is of generally cylindrical configuration and is disposed concentrically with, and in close relation to, the central supporting member 110. The element 120 extends above the upper end of the member 110 to form a cylindrical bore, the conductive sidewalls of which are engageable with the compressible resilient member 116 when the switch of FIG. 6 is actuated, as will subsequently be described.

Disposed concentrically around the conducting element 120 is a switch housing 124, which may be of any suitable configuration, and which is shown in FIG. 6 as being provided with a flange 126 and a threaded lower portion 128. At its upper end, the housing 124 is provided with a lip 130, which cooperates with an annular retaining portion 132 on an actuator 134, said retaining portion functioning to maintain the actuator in assembled relation to the housing 124.

As may be seen from a comparison of FIGS. 6 and 7, when the switch is in its normal unoperated condition, there is no connection between the conducting elements 114 and 120, and consequently no conducting path through the switch. Operation of the switch is accomplished by depression of the actuator 134, which compresses the member 116 to cause it to engage the element 120, as well as the element 114 in which it is positioned, and also to assume a state of relatively high conductivity by engagement with each other of the small conductive particles contained therein, in the manner previously described.

When pressure on the actuator 134 is released, the resilience of the member 116 causes the actuator to return from the position shown in FIG. 7 to that shown in FIG. 6. The member 116 thus serves the dual function of providing a conducting medium and providing spring action for the actuator 134.

Shown in FIG. 8 is a connector unit which embodies the novel circuit controlling means of the present invention. While the connector is illustrated as showing connecting means for two sets of conductors, it should be understood that this embodiment is equally adaptable for use with a single set of conductors, or with more than two sets of conductors.

A connector supporting structure or base 140 is provided with two bores 142 of stepped cylindrical configuration, and a conductive element 144 of corresponding configuration is disposed in each of the bores. Each element 144 is flared at one end to accommodate a conductor plug 146, connected to a conductor 148, and is provided at its other end with an enlarged stepped portion 150, in which is positioned a compressible resilient member 152 of generally cylindrical configuration, having the same properties of low conductivity in normal state and relatively high conductivity in compressed state as described previously for the members 22, 56, 98, 100, and 116 in the embodiments of FIGS. 1, 2, 5, and 6, respectively.

Constructed and arranged to mate with the base 140 is a cap 154 provided with two conductive elements 156 located to engage the compressible resilient members 152 when the cap and the base are brought into engagement. The elements 156 may be connected to conductors (not shown) corresponding to the conductors 146 by any appropriate means. A slot 158 in the cap cooperates with a projection 160 on the base to insure proper relative positioning of the cap and the base as they are brought into engagement with each other.

A threaded portion 162 on the cap 154 cooperates with internal threads 164 on a cover 166 to secure the base 140 and the cap 154 together in operative relation. An insulating disk 168 is positioned between the base 140 and the cover 166.

The connector is shown in FIG. 8 in a partially engaged position in which the projection 160 extends slightly into the slot 158, and in which the threaded portions 162 and 164 are engaged, but in which the compressible resilient members 152 are not engaged with the conductive elements 156, so that there is no electrical connection between the conductive elements 142 and 156. It will be apparent that such an electrical connection can be established by bringing the cap 154 into full engagement with the base 140, so that the conductive elements 156 engage and compress the members 152, causing conductive engagement of the small individual conductive elements within said members, to establish the desired electrical connection between the elements 142 and 156. Compression of the members 152 also causes their spreading in a transverse direction, so that they engage the stepped sidewall portions 150 of the elements 142, providing short-distance conductive paths through the members 152 for maximum efficiency.

While the embodiments of the invention shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. An electrical circuit controlling device comprising, in combination:

a nonconductive supporting structure having at least one recess therein defined by base and sidewall portions, and being of stepped configuration;

first conductor means disposed in a wall formation on the sidewall portion of the recess in the supporting structure and also being stepped to conform to the configuration of the sidewall portion of the recess;

compressible resilient means positioned in said recess engaging said first conductor means disposed on said sidewall portion of said recess, and having a portion thereof projecting above the surface of the nonconductive supporting surface, the compressible resilient means having a very low conductivity when in a noncompressed condition, and having a relatively high conductivity when compressed; and second conductor means, said second conductor means and said compressible resilient means being engageable with each other, whereby compression of the compressible resilient means and engagement thereof with the second conductor means results in the establishing of a conductive path between the first and second conductor means, the stepped configuration of the recess in the supporting structure providing space into which the projecting portion of the compressible resilient means may be displaced when said second conductor means and said compressible resilient means are brought into engagement with each other.

2. The device of claim 1 in which the compressible resilient means includes a plurality of individual conductive elements disposed within a resilient medium, the individual conductive elements establishing conductive engagements with each other to provide a conductive path through the compressible resilient means when it is compressed.

3. The device of claim 1 in which there are a plurality of recesses in the supporting structure, each recess being in the form of a slot, one of said first conductor means being disposed in each slit, and one of said compressible resilient means of elongated configuration being positioned within each slot.

4. The device of claim 3 in which each compressible resilient means is formed with a plurality of projections and in which the second conductor means includes a plurality of conductive elements capable of selective electrical connection with the first conductor means by compression of selected projections of the compressible resilient means, and engagement thereof with the second conductor means.

5. The device of claim 4 in which the conductive elements of the second conductive means are disposed on one surface of a movable closure member by movement of which they may be brought into compressive engagement with the projections of the compressible resilient means to establish electrical connections between the first and second conducting means and thus enable sensing of information contained on a perforated record member inserted between the movable closure member and the supporting structure of the device.

6. The device of claim 1 in which the stepped recess is in the form of a slot with a narrower portion at the bottom and a wider portion adjacent to the surface of the supporting structure.

7. The device of claim 1 in which the recess is generally cylindrical, with the stepped portions being of different diameters.

8. The device of claim 1 in which push button means are provided to compress the compressible resilient means and thus establish a conductive path between the first and second conductor means, said push button means being biased to an unoperated position by the resilience of the compressible resilient means.

9. The device of claim 8 in which the first and second conductor means are arranged in fixed spaced concentric relation, and in which the push button means is effective, when operated, to cause the compressible resilient means to engage the second conductor means.

10. The device of claim 1 in which the circuit controlling device includes a second supporting structure on which the second conductor means is located which may be brought into engagement with the first supporting structure on which the first conductor means is located to compress the compressible resilient means and establish electrical contact between the first and second conductor means.

11. The device of claim 10 in which the circuit controlling device includes cooperating securing means and cooperating aligning means associated with the first and second supporting structures to retain the second conductor means in properly aligned engagement with the compressible resilient means, whereby said device functions as an electrical connector.

References Cited

UNITED STATES PATENTS

| | | | |
|---|---|---|---|
| 2,305,717 | 12/1942 | La Bell | 338—114 |
| 2,752,558 | 6/1956 | Kane | 338—114 |
| 3,125,739 | 3/1964 | Deibel et al. | 338—99 |
| 3,200,240 | 8/1965 | Hammel. | |

FOREIGN PATENTS 719,268  11/1931  France.

ROBERT S. MACON, Primary Examiner

D. SMITH, Jr., Assistant Examiner

U.S. Cl. X.R.

200—159; 235—61.1; 338—99, 114